(12) United States Patent
Bokvist et al.

(10) Patent No.: US 11,022,777 B2
(45) Date of Patent: Jun. 1, 2021

(54) LENS HOLDER, LENS MEMBER, LENS ARRANGEMENT AND CAMERA DEVICE COMPRISING SUCH A LENS ARRANGEMENT

(71) Applicant: Axis AB, Lund (SE)

(72) Inventors: Malte Bokvist, Lund (SE); Jöns Danelius, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/930,465

(22) Filed: May 13, 2020

(65) Prior Publication Data

US 2021/0080689 A1 Mar. 18, 2021

(30) Foreign Application Priority Data

Sep. 16, 2019 (EP) .................................. 19197572

(51) Int. Cl.
*G02B 7/02* (2021.01)
*G02B 7/14* (2021.01)
(52) U.S. Cl.
CPC ..................................... *G02B 7/14* (2013.01)
(58) Field of Classification Search
CPC ....................................................... G02B 7/14

USPC .......................................... 359/811, 819, 827
See application file for complete search history.

(56) References Cited

U.S. PATENT DOCUMENTS

| 5,457,577 A | 10/1995 | Wilson |
| 8,066,441 B2 | 11/2011 | Hsieh et al. |
| 9,389,488 B1 | 7/2016 | Kovacs |
| 2012/0288272 A1 | 11/2012 | Pavithran et al. |

FOREIGN PATENT DOCUMENTS

CN 2736790 Y 10/2005

*Primary Examiner* — William Choi
(74) *Attorney, Agent, or Firm* — Xsensus LLP

(57) ABSTRACT

A lens arrangement of a camera device includes a lens holder and a lens member, the lens member being slidingly received by the cavity by axial insertion of the lens member into the cavity such that the longitudinal lens holder axis coincides with the longitudinal lens member axis, wherein a locking force is applied by the locking member in a direction from the first lens holder surface section, the locking force being perpendicular to the plane, wherein the lens holder protrusion and the lens member protrusion are such aligned that the locking force applied by the locking member in the direction from the first lens holder surface section is applied to the first lens member surface section. The second lens member surface section engage the second lens holder surface section in response to the locking force applied to the first lens member surface section.

10 Claims, 3 Drawing Sheets

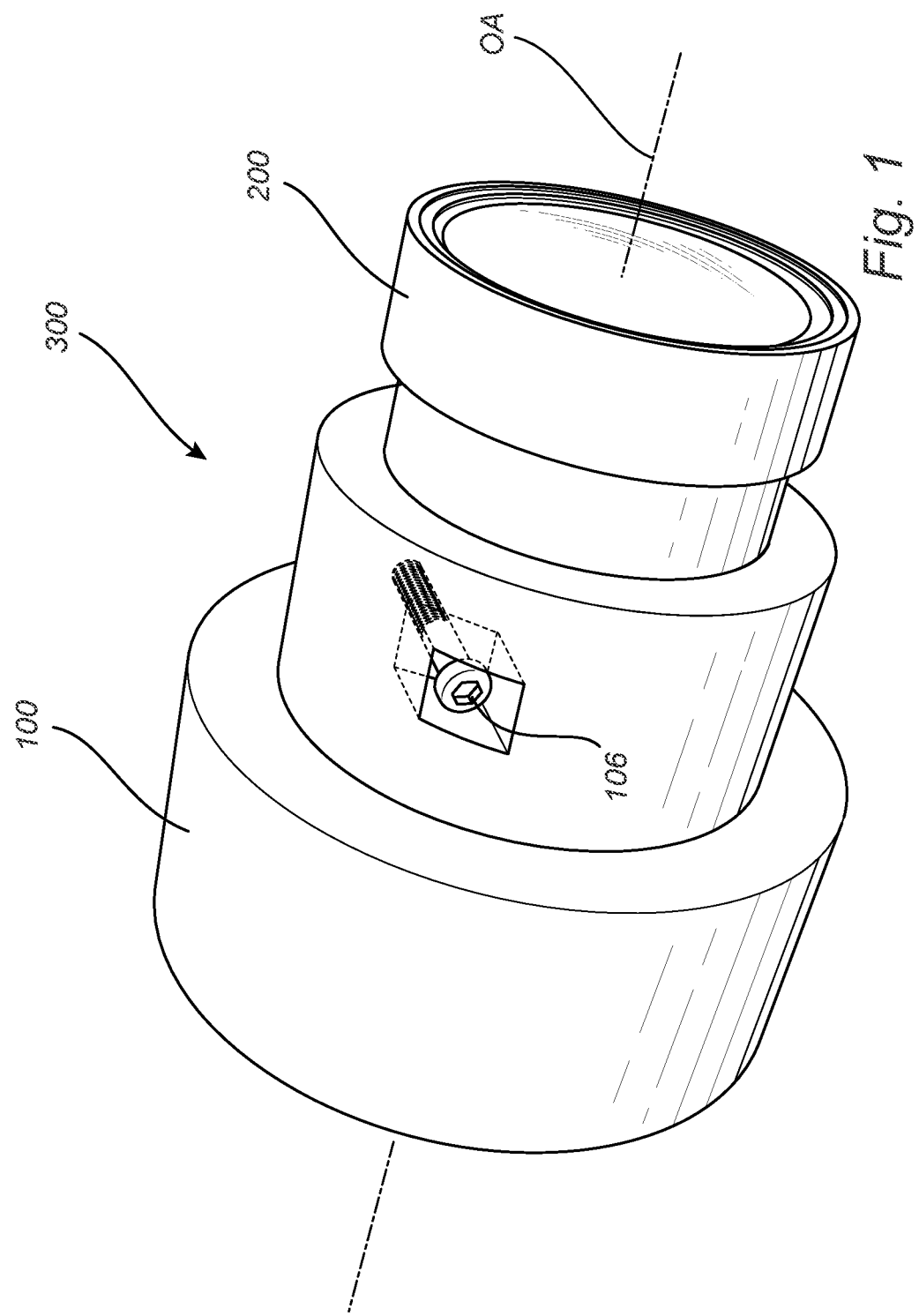

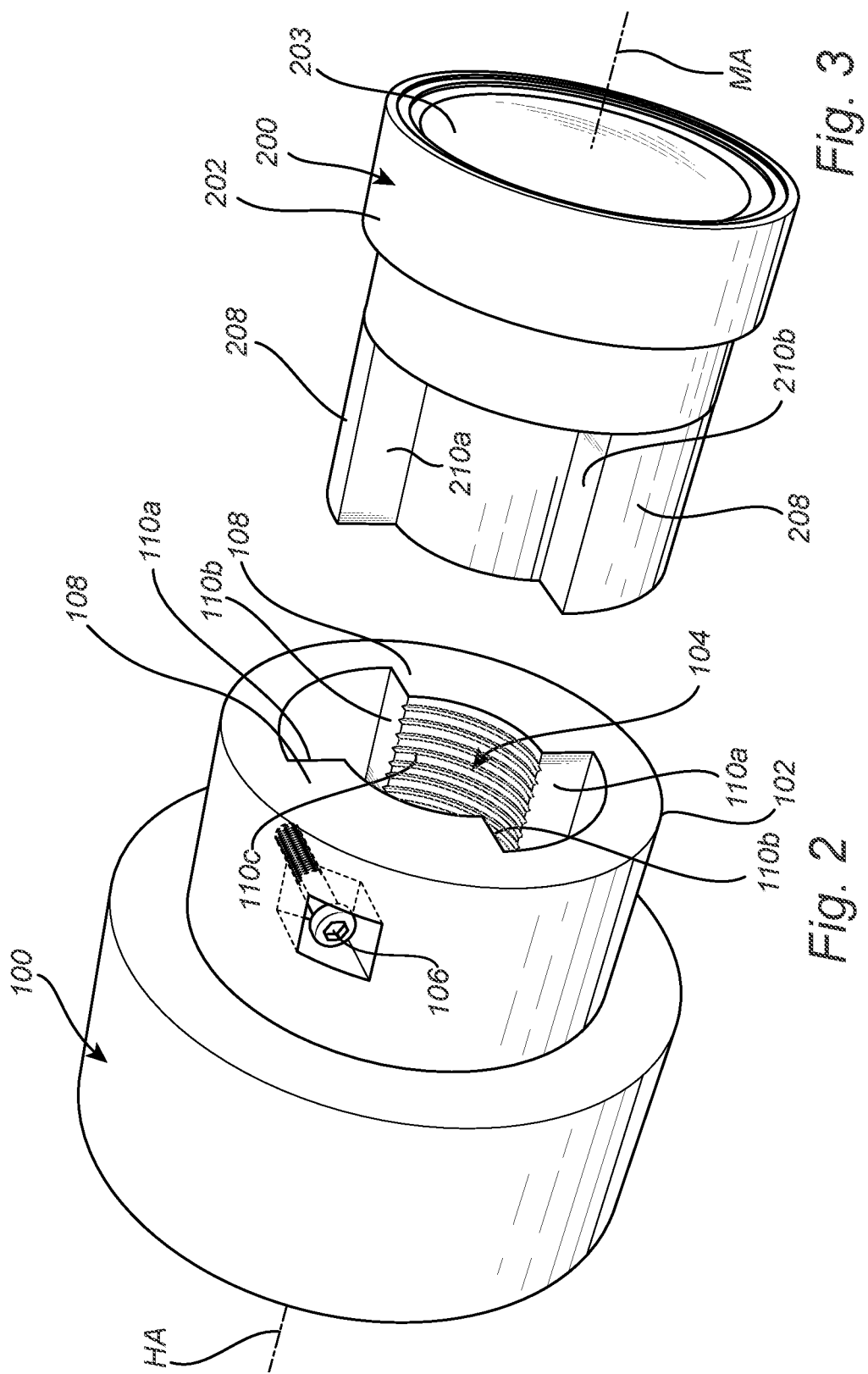

LENS HOLDER, LENS MEMBER, LENS ARRANGEMENT AND CAMERA DEVICE COMPRISING SUCH A LENS ARRANGEMENT

CROSS-REFERENCE TO RELATED APPLICATION

The present application claims priority to EP 19197572.1, filed Sep. 16, 2019, the entire contents of which are incorporated herein by reference.

FIELD OF THE INVENTION

The invention relates to a lens holder and a lens arrangement comprising such a lens holder. The invention further relates to a camera device comprising such a lens arrangement.

BACKGROUND ART

Modular cameras such as network cameras may be used in many different situations, both indoors and outdoors. The versatility of modular cameras has led to an increased demand for cost effective production of modular cameras. To meet this demand, it is desirable to reduce not only the cost of the components of the modular cameras, but also the costs associated with the assembly of the modular cameras.

A modular camera normally comprises two separate parts; a sensor unit and a main unit connected to the senor unit via cable.

The sensor unit may comprise a lens holder and a lens member releasably supported by the lens holder. An image sensor may be arranged in the lens holder.

The main unit may be arranged for image processing and network communication, and may also be placed separately from the sensor unit.

The sensor unit of a modular camera thus comprises several components, and the assembly of the sensor unit requires a plurality of steps which are complicated, time consuming and costly. Furthermore, the assembly requires high precision. Small deviations in the relative position of the components within the sensor unit of the modular camera may for example lead to misalignment reducing the performance of the modular camera. Specifically, proper alignment of the lens member in the lens holder is especially critical as a small deviation may significantly reduce the image quality achieved by the modular camera.

Conventionally, the lens member may be releasably supported by the lens holder by means of a threaded fitting, which may result in contamination of the image sensor with particles during assembly, thereby causing a risk of blemishing of images captured by a camera device.

Alternatively, the lens member may be slidingly insertable into a cavity of the lens holder and locked in place by means of radially directed locking screws, thereby introducing a risk of radial displacement and tilting of the lens member when tightening the locking screws.

Further, the proper alignment of the lens member may be affected by vibrations, and other changes in the environment of the modular camera, which thus may degrade its performance before, during or after the installation of the modular camera at a scene.

CN2736790Y discloses a digital camera zoom lens structure comprising a sleeve and a lens assembly including a lens barrel contained in the sleeve. The lens barrel is provided with guiding protrusions extending in the longitudinal direction of the lens barrel, which guiding protrusions are received by correspondingly shaped grooves inside the sleeve.

SUMMARY OF THE INVENTION

In view of that stated above, the object of the present invention is to provide a lens holder and a lens member mitigating at least some of the problems disclosed above. It is an object of the present invention to further provide a lens arrangement allowing for improved arrangement and positioning of a lens member in a lens holder of a camera device. A further object is to provide a lens arrangement with reduced risk of blemishing.

To achieve at least one of the above objects and also other objects that will be evident from the following description, a lens holder, a lens member, a lens arrangement and a camera device are provided according to the present invention. Preferred embodiments will be evident from the description.

According to a first aspect of the invention, a lens holder for a lens arrangement of a camera device is provided, comprising: a wall surrounding a cavity extending along a longitudinal lens holder axis and configured for reception of the lens member, a locking member arranged in the wall and configured for engagement with the lens member when inserted into the cavity for locking thereof. The wall has a lens holder protrusion extending radially into the cavity, the lens holder protrusion comprises a first and a second lens holder surface section, each extending in a plane defined by the longitudinal lens holder axis and a radius to the longitudinal lens holder axis. The locking member is configured to apply, in a direction from the first lens holder surface section, a locking force being perpendicular to the plane of the first lens holder surface section.

A cost effective assembly of a lens holder and a lens member for a lens arrangement may be provided. An advantage of the lens holder is that the risk of blemishing on an image sensor may be reduced. A further advantage is that the lens holder may allow a lens member to be efficiently maintained locked in a desired position relative to the lens holder. Another advantage of the lens holder is that the inserted lens member may be locked in place by a rotational movement. Since a lens unit of a lens member is often rotationally symmetrical, any rotation of the lens member during locking thereof will not cause radial displacement or tilting of the lens member and thereby not have a negative effect on the quality of a captured image.

Moreover, the protrusions allow the lens member to be slidingly insertable into the cavity and thus there is a reduced risk of the lens member tilting or being offset to the side.

The locking member may provide a lens arrangement comprising the lens holder with a simple locking mechanism. The locking mechanism is configured to apply a locking force which is perpendicular to the plane of the first lens holder surface section, i.e. the locking force has a tangential direction and may thus act on a lens member inserted into the cavity of the lens holder for locking thereof while reducing the risk of misalignment of the lens member about the longitudinal lens holder axis.

The lens holder being adapted to slidingly receive a lens member may provide a simple assembly of a lens arrangement comprising the lens holder and a lens member. Such a configuration, which in contrast to conventional configurations does not comprise a thread joint between the lens holder and the lens member, may facilitate assembly and also eliminate or at least substantially reduce the risk of contamination of the image sensor with particles during assembly, thereby reducing the risk of blemishing of images captured by a camera device comprising a lens holder in accordance with the invention.

The locking member may comprise a threaded member such as a set screw. The set screw may have a pointed distal end. By this, the set screw may reliably maintain the alignment of a lens member assembled with the lens holder over time. The set screw thereby provides a locking force that is perpendicular to the longitudinal lens holder axis onto the first lens holder member surface section.

The lens holder protrusion may comprise a third lens holder surface section extending at a constant radial distance from the longitudinal lens holder axis. The third lens holder surface section may be provided with a thread. By the third lens holder surface section being provided with a thread, a standard lens such as lens having a M12 or M20 thread may be used together with the lens holder. Thus, an improved flexibility of the use of the lens holder may be achieved, since different types of lens members may be used with one lens holder. The lens holder may thus be arranged to receive a threaded and a non-threaded lens member. This may provide an end user with a cost-efficient lens arrangement.

The lens holder may be arranged to support a lens member for a lens arrangement of a camera device, which lens member is slidingly receivable by a cavity of the lens holder by axial insertion. The lens member comprising: a barrel supporting a lens unit and extending along a longitudinal lens member axis. The barrel comprises a lens member protrusion extending radially outwardly and having a first and second lens member surface section, each extending in a plane defined by the longitudinal lens member axis and a radius to the longitudinal lens member axis. The first lens member surface section is configured to be subjected to a locking force being perpendicular to the plane of the first lens member surface section and applied in a direction from a first lens holder surface section of the lens holder when the lens member is inserted into the cavity of the lens holder. The second lens member surface section is configured to engage with a second lens holder surface section of the lens holder in response to the first lens member surface section being subjected to the locking force when the lens member is inserted into the cavity.

By the lens member being slidingly receivable by the cavity of a lens holder it is to be understood that the whole lens member must not be inserted into the cavity. At least an end section of the lens member may be receivable by the cavity of the lens holder. The axial insertion into the cavity may be along a longitudinal lens holder axis.

Advantages described above with reference to the lens holder are when applicable also valid for the lens member.

According to a second aspect of the invention, a lens arrangement of a camera device is provided. The lens arrangement comprising: a lens holder according to the first aspect, a lens member as disclosed above, the lens member being slidingly received by the cavity by axial insertion of the lens member into the cavity such that the longitudinal lens holder axis coincides with the longitudinal lens member axis. A locking force is applied by the locking member in a direction from the first lens holder surface section, the locking force being perpendicular to the plane of the first lens member surface section. The lens holder protrusion and the lens member protrusion are such aligned that the locking force applied by the locking member in the direction from the first lens holder surface section is applied to the first lens member surface section; and the second lens member surface section engage the second lens holder surface section in response to the locking force applied to the first lens member surface section.

The provided lens arrangement may provide a lens arrangement with a reduced risk of misalignment of the lens. This may be achieved by giving the lens unit a rotationally symmetrical shape, and the lens member being locked in place by the rotational locking force.

The lens holder protrusion and the lens member protrusion may be complementary shaped and configured to establish an axial guide during axial insertion of the lens member into the lens holder. The lens holder and the lens member may be complementary shaped such as to minimize play between the lens holder and the lens member when assembled, thus providing a stable lens arrangement where the lens member is held in place with low risk of getting misaligned.

The lens holder may comprise at least two protrusions being circumferentially evenly distributed. The lens member comprises at least two protrusions being circumferentially evenly distributed. Hereby, a lens arrangement is provided with improved stability in the assembled state. By evenly distributing the protrusions, the locking force asserted by the locking member may be evenly distributed around the section surfaces and provide an evenly distributed locking force. Two protrusions of the lens holder as well as of the lens member may balance the tangentially directed locking force and create a stable lock between the lens member and the lens holder. This may improve the durability of the lens arrangement.

An insertion depth of the lens member may be adjustable by means of the locking member. It is to be noted that the lens member may be inserted and locked in place at different insertion depths in order to provide an accurate focus within given tolerances.

The lens arrangement may comprise an image sensor arranged at a bottom of the cavity. The image sensor is faced towards the lens unit.

According to a fourth aspect of the invention, a camera device is provided comprising the lens arrangement described above. The camera device may be a monitoring camera providing video sequences. The function and benefits of the camera device are described above in relation to the lens holder, the lens member and the lens arrangement. The above-mentioned features, when applicable, apply to this fourth aspect as well. It is noted that the invention relates to all possible combinations of features recited in the claims.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1 is a perspective view of a lens arrangement.

FIG. 2 is a perspective view of a lens holder of the lens arrangement shown in FIG. 1.

FIG. 3 is a perspective view of a lens member of the lens arrangement shown in FIG. 1.

DESCRIPTION OF EMBODIMENTS

Figure 4:
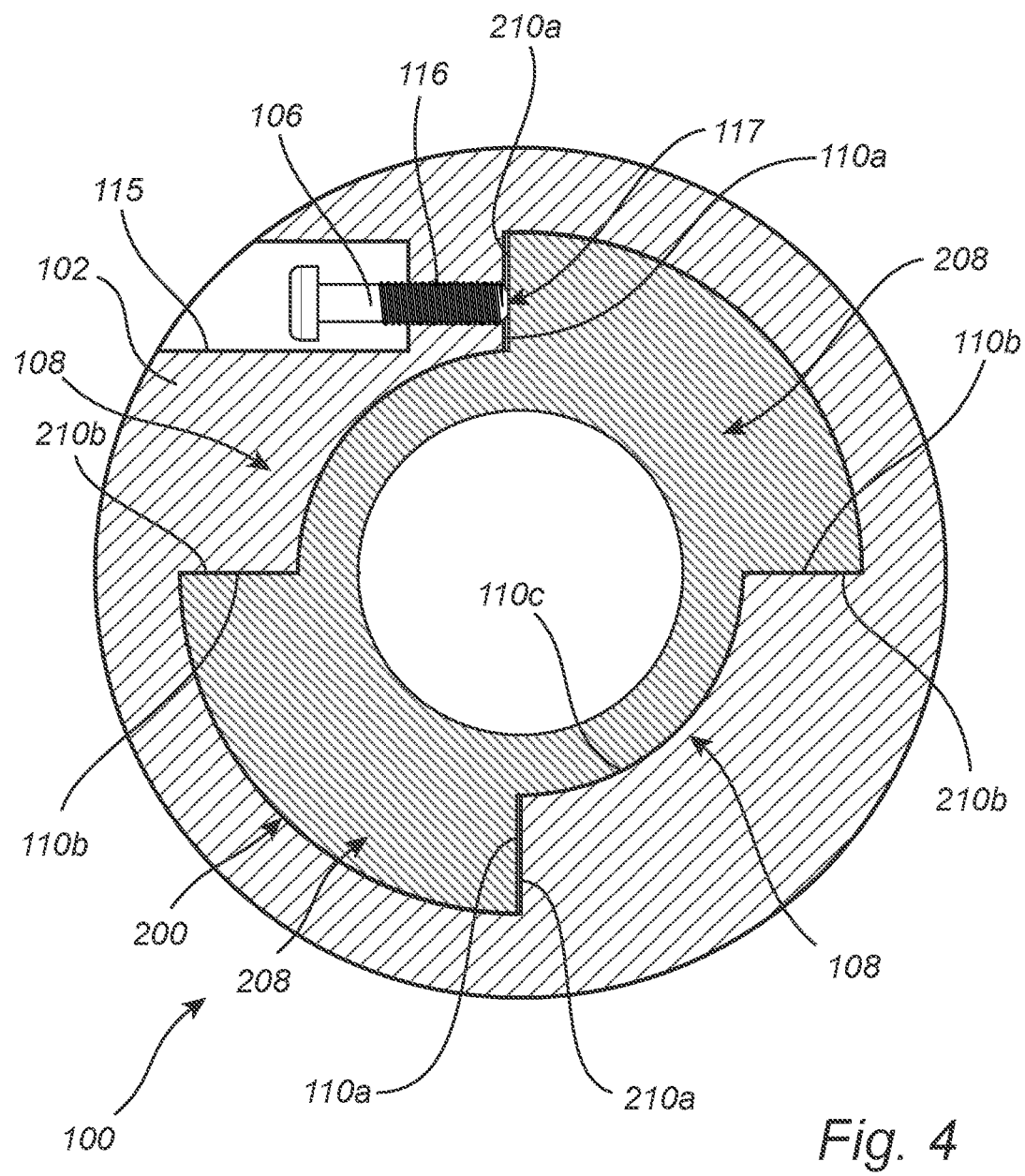
FIG. 4 is a cross sectional view illustrating the lens holder shown in FIG. 2 and the lens member shown in FIG. 3 in an assembled state.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

A lens arrangement 300 for a camera device will in the following be described with reference to FIGS. 1-4.

FIG. 1 illustrates an embodiment of the lens arrangement 300. The lens arrangement 300 comprises a lens holder 100 and a lens member 200 releasably attached to the lens holder 100. The lens holder 100 and the lens member 200 are aligned along an optical axis OA.

As evident from FIG. 2, the lens holder 100 comprises a section having a wall 102 surrounding a cavity 104. The lens holder further comprises a locking member 106 which in the shown embodiment is arranged in the wall 102. An image sensor may be arranged in the lens holder. It is to be noted that the lens holder 100 may be manufactured in different shapes and forms.

The cavity 104 extends along a longitudinal lens holder axis HA of the lens holder 100. The cavity 104 is arranged to slidingly receive the lens member 200 by axial insertion thereof into the cavity 104, i.e. by aligning the lens member 200 with the cavity 104 of the lens holder 100 and subsequently moving the lens member 200 relative the lens holder 100 along the lens holder axis HA, thereby inserting the lens member 200 or at least a section thereof into the cavity 104.

The wall 102 of the lens holder 100 comprises at least one lens holder protrusion 108. As is shown in FIG. 1, the lens holder 100 may comprise two lens holder protrusions 108. It is noted that the lens holder 100 may have any number of lens holder protrusions 108.

Each lens holder protrusion 108 extends radially inwards into the cavity 104.

Each lens holder protrusion 108 comprises a first and a second lens holder surface section 110a, 110b. Each one of the first and second lens holder surface sections 110a, 110b extends in a plane. The plane is defined by the longitudinal lens holder axis HA and a normal to the longitudinal lens holder axis HA.

The locking member 106 is as mentioned above arranged in the wall 102 surrounding the cavity 104. The locking member 106 is adapted to engage and lock the lens member 200 when it is inserted into the cavity 104.

In the shown embodiment, the locking member 106 comprises a threaded member, such as a set screw, arranged in a channel 115 provided in the wall 102, which is more clearly shown in FIG. 4.

The channel 115 extends in a direction perpendicular to the plane of the first lens holder surface section 110a of one of the lens holder protrusions 108 and comprises a threaded end portion 116 terminating with an end opening 117 provided in the first lens holder surface section 110a.

The locking member 106 in the form of a set screw is arranged for threaded engagement with the threaded end portion 116 of the channel 115, and the set screw may thus be brought to a position in which a distal end of the set screw protrudes from the end opening 117 of the threaded end portion 116 and thus also protrudes from the first lens holder surface section 110a of the lens holder protrusion 108.

The set screw may have a pointed distal end. The pointed distal end may improve the stability of the lens arrangement 300 in an assembled state.

It is noted that there are many possible variations to the locking member 106. In one example, the set screw may comprise a pushed or biased pin. In another example, the locking member 106 may comprise a pushed or biased pin. The locking member 106 may further comprise an adhesive to secure the locking force holding the lens member 200 in place.

As shown in FIG. 3, the lens member 200 comprises a barrel 202.

The barrel 202 supports a lens unit 203 that has an extension along a longitudinal lens member axis MA of the lens member 200.

The lens member 200 further comprises at least one lens member protrusion 208 having a radially outwardly directed extension. In the shown embodiment, the lens member 200 comprises two lens member protrusions 208.

In the shown embodiment, the two lens member protrusions 208 are formed by means of provision of two oppositely arranged grooves in a section of the lens member (only one groove visible in FIG. 3). As an alternative, the lens member protrusions 208 may be formed as projections extending from the envelope surface of the lens member 200.

Each lens member protrusion 208 has a first and a second lens member surface section 210a, 210b. Each one of the first and second lens member surface sections 210a, 210b extends in a plane of the lens member 200. The plane is defined by the longitudinal lens member axis MA and a normal to the longitudinal lens member axis MA.

The lens holder 100 is arranged to slidingly receive the lens member 200 by axial insertion thereof, such that the longitudinal lens holder axis HA coincides with the longitudinal lens member axis MA.

In FIG. 4, which is a cross sectional view taken in a plane perpendicular to the optical axis OA of the lens arrangement 300, the lens arrangement 300 is illustrated in an assembled state, i.e. the lens member 200 being inserted into the cavity 104 of the lens holder 100. In the assembled state of the lens arrangement 300, the lens holder axis HA and the lens member axis MA are aligned with the optical axis OA of the lens arrangement 300.

As evident from the figure, the lens holder protrusions 108 and the lens member protrusions 208 are complementary shaped and may thereby establish an axial guide during insertion of the lens member 200 into the cavity 104 of the lens holder 100 such that the lens member axis MA coincides with the lens holder axis HA thereby aligning with the optical axis OA of the lens arrangement 300. In some examples the lens holder 100 may comprise grooves corresponding to the lens member protrusions 108 to provide the axial guide during insertion of the lens member 200 into the lens holder 100. The operation of the locking member 106 will now be discussed with reference to FIG. 4.

The locking member 106 is configured to apply, in a direction from the first lens holder surface section 110a of the associated lens holder protrusion 108, a locking force to the first lens member surface section 210a of one of the lens member protrusions 208 of the lens member 200 when the lens member 200 is inserted into the cavity 104. Thus, the first lens holder surface section 210a is configured to be subjected to the locking force.

In the shown embodiment, the locking member 106 in the form of a set screw is configured to apply the locking force by the set screw being screwed such that the distal end thereof protrudes from the first lens holder surface section 110a and engages the first lens member surface section 210a.

The locking force applied to the lens member 200 has a direction being perpendicular to the plane of the first lens holder surface section 110a and also being perpendicular to the plane of the first lens member surface section 210a.

The locking force is applied to the first lens member surface section 210a and will thus cause a rotational movement of the lens member 200 about the optical axis OA. The rotational movement will be restricted by the play present between the complementary shaped lens holder protrusions 108 and lens member protrusions 208. The complementary shaped lens holder protrusions 108 and lens member protrusions 208 will prevent the lens member 200 to be radially displaced or tilted. This configuration may improve the quality of the captured image since it provides the lens arrangement with a reduced risk of the whole image or part of the image being out of focus.

The second lens member section surface 210b of each lens member protrusion 208 is configured to engage with a corresponding second lens holder surface section 110b of the lens holder 100 in response to the rotational movement of the lens member 200, i.e. as a response to the first lens member surface section 210a being subjected to the locking force In other words, the lens holder protrusions 108 and the lens member protrusions 208 are such aligned that the locking force applied by the locking member 106 in the direction from the first lens holder surface section 110a of one of the lens holder protrusions 108 is applied to the first lens member surface section 210a of one of the lens member protrusions 208. Each second lens member surface section 210b will then engage the associated second lens holder surface section 110b in response to the locking force being applied to the first lens member surface section 210a.

The lens member 200 is thus locked by the rotational movement of the lens member 200 caused by the locking force and pressing the second lens member surface sections 210b against the corresponding second lens holder surface sections 110b. This rotational movement of the lens member 200 about the optical axis OA ensures locking of the lens member without any risk of tilting of the lens member 200.

The insertion depth of the lens member 200 into the cavity 104 of the lens holder 100 may be adjustable. The lens member 200 may thus be locked at different depths into the cavity by means of the locking member 106. Hereby, correct focus setting of the lens arrangement is facilitated. In other words, the locking member 106 may be arranged to engage the first lens member surface section 210a at different places to allow for the lens member 200 to be locked at different insertion depths. This configuration may allow a simple readjustment of the lens member 200 if the lens arrangement is out of focus.

As been described above, the lens holder 100 and the lens member 200 may each comprise at least two protrusions. The at least two protrusions 108 of the lens holder 100 may be circumferentially evenly distributed. The at least two protrusions 208 of the lens member 200 may be circumferentially evenly distributed. The at least two protrusions of the lens holder 100 and the lens member 200 may be complementary shaped to provide the axial guide. Problems associated with misalignment of the lens arrangement 300 may thereby be mitigated.

In an example where the lens member 200 comprises two oppositely arranged protrusions. In such a case, a cross section of the lens member 200 may have a shape similar to that of a bow tie.

Each lens holder protrusion 108 may, as shown in FIG. 2, comprise a third lens holder surface section 110c. The third lens holder surface section 110c may have an extension at a constant radial distance from the longitudinal lens holder axis HA. The third lens holder surface section 110c may be faced inwardly towards the center of the lens holder 100. The third lens holder surface section 110c may be provided with a thread. The tread may be configured such that the lens holder 100 is adapted to receive a lens member having a threaded end section. In such a case, the lens member may be held in place in the lens holder 100 by screwing the lens member into the cavity 104 of the lens holder. This may allow a conventional lens member to be received into the cavity 104 of the lens holder 100. The standard lens may by way of example have a M12 or a M20 thread. Hereby, a lens arrangement 300 is provided which is compatible with different types of lenses members.

The lens holder 100 of the lens arrangement 300 may comprise an image sensor. The image sensor may be arranged at a bottom of the cavity 104 of the lens holder 100. The image sensor may be faced towards the lens unit 203 of the lens member 200.

The longitudinal lens member axis MA and the longitudinal lens holder axis HA may as described above coincide with the optical axis of the lens arrangement 300 in the assembled state thereof.

The camera device comprising the lens arrangement 300 may be a modular camera comprising a sensor unit and a main unit connected to the senor unit via cable. The lens arrangement 300 may be included in the sensor unit. The main unit may be arranged for image processing and network communication, and may also be placed separately from the sensor unit.

The camera device comprising the lens arrangement 300 may be a monitoring camera providing video sequences.

It is noted that the lens arrangement may be comprised in a variety of different camera devices.

The camera device may be a device where the focus is determined during mounting of the lens member, or during an exchange of the lens member. In one example, the camera device may be a fixed focus camera. In another example the camera device may be an auto focus camera. In another example the camera device may be a varifocal camera.

It is noted that the camera device may be a box camera or a dome camera. The camera device may be a non-modular camera wherein the image capture and image processing are not physically separated from each other.

By way of example, the camera device may be a device wherein the lens holder is attached to an image senor printed circuit board and arranged in the direct vicinity of the main unit. The main unit may be connected to the lens holder by, for example, direct contact or cable.

It will be appreciated that the present invention is not limited to the embodiments shown. Several modifications and variations are thus conceivable within the scope of the invention which thus is exclusively defined by the appended claims.

The invention claimed is:

1. A lens holder for a lens arrangement of a camera device, the lens holder being arranged to support a lens member of the lens arrangement, the lens holder comprising:
   a wall surrounding a cavity extending along a longitudinal lens holder axis and being configured for reception of the lens member,
   a locking member arranged in the wall and configured for engagement with the lens member when inserted into the cavity for locking thereof, characterized in that
   the wall has a lens holder protrusion extending radially into the cavity, the lens holder protrusion comprising a first and a second lens holder surface section, each extending in a plane defined by the longitudinal lens holder axis and a normal to the longitudinal lens holder axis,
   wherein the locking member is configured to apply, in a direction from the first lens holder surface section, a locking force being perpendicular to the plane of the first lens holder surface section.

2. The lens holder according to claim 1, wherein the locking member comprises a set screw.

3. The lens holder according to claim 2 wherein the set screw has a pointed distal end.

4. The lens holder according to claim 1, wherein the lens holder protrusion comprises a third lens holder surface section extending at a constant radial distance from the longitudinal lens holder axis, wherein the third lens holder surface section is provided with a thread.

5. A lens arrangement of a camera device, the lens arrangement comprising:
   a lens holder according to claim 1 and
   a lens member comprising a barrel supporting a lens unit and extending along a longitudinal lens member axis, wherein the barrel comprises a lens member protrusion extending radially outwardly and having a first and second lens member surface section, each extending in a plane defined by the longitudinal lens member axis and a normal to the longitudinal lens member axis,
   the lens member being slidingly received by the cavity by axial insertion of the lens member into the cavity such that the longitudinal lens holder axis coincides with the longitudinal lens member axis,
   wherein a locking force is applied by the locking member in a direction from the first lens holder surface section, the locking force being perpendicular to the plane of the first lens member surface section,
   wherein the lens holder protrusion and the lens member protrusion are such aligned that the locking force applied by the locking member in the direction from the first lens holder surface section is applied to the first lens member surface section; and the second lens member surface section engage the second lens holder surface section in response to the locking force applied to the first lens member surface section.

6. The lens arrangement according to claim 5, wherein the lens holder protrusion and the lens member protrusion are complementary shaped and configured to establish an axial guide during axial insertion of the lens member into the lens holder.

7. The lens arrangement according to claim 5, wherein the lens holder comprises at least two protrusions being circumferentially evenly distributed; and wherein the lens member comprises at least two protrusions being circumferentially evenly distributed.

8. The lens arrangement according to claim 5, wherein an insertion depth of the lens member is adjustable by means of the locking member.

9. The lens arrangement according to claim 5, further comprising an image sensor arranged at a bottom of the cavity, wherein the image sensor is faced towards the lens unit.

10. A camera device comprising a lens arrangement according to claim 5.

* * * * *